United States Patent [19]
Ward

[11] Patent Number: 4,561,406
[45] Date of Patent: Dec. 31, 1985

[54] WINGED REENTRANT ELECTROMAGNETIC COMBUSTION CHAMBER

[75] Inventor: Michael A. V. Ward, Arlington, Mass.

[73] Assignee: Combustion Electromagnetics, Inc., Arlington, Mass.

[21] Appl. No.: 614,338

[22] Filed: May 25, 1984

[51] Int. Cl.$^4$ .............................................. F02P 1/00
[52] U.S. Cl. .................. 123/536; 123/143 B; 123/606
[58] Field of Search ...................... 123/143 B, 536, 606

[56] References Cited

U.S. PATENT DOCUMENTS

| | | | |
|---|---|---|---|
| 2,617,841 | 11/1952 | Linder | 123/143 B X |
| 3,934,566 | 1/1976 | Ward | 123/143 B X |
| 4,138,980 | 2/1979 | Ward | 123/143 B X |
| 4,297,983 | 11/1981 | Ward | 123/536 |

Primary Examiner—Tony M. Argenbright
Attorney, Agent, or Firm—Jerry Cohen

[57] ABSTRACT

An internal combustion engine combustion chamber suitable for electromagnetic stimulation of combustion which has been improved by the addition of combustion chamber periphery extensions (wings) filled with dielectric material. The wing dimensions and filler dielectric material are chosen to allow for specification of the chamber EM resonant frequency, preferably at a frequency in the UHF range (where low cost DC operated devices can be used) and at an industrial allocated frequency. The wing chamber EM resonant modes are further designed to place relatively high electrical currents at the wing tips (which are totally closed surfaces), and low EM currents at the piston-cylinder gaps, thus eliminating the need for EM chokes. The EM feature of the chamber is further improved by shaping the piston face and/or cylinder head face in conjunction with the wing design to further lower the EM operating frequency and improve frequency stability with respect to piston motion about TDC. EM resonsant modes with high EM currents at the center of the chamber are preferably excited, which further improves frequency stability and EM coupling to the flame front plasma, especially when used with ceramic heat barrier coatings on the piston and cylinder faces. The engine uses dual plasma ignition and a simple EM loop coupler at the wing tip to introduce the EM energy which is modulated to minimize formation of unwanted plasma discharges. The engine uses an extremely lean mixture and minimal cooling for highest efficiency, lowest emissions, lightest weight and simplest design and operation.

35 Claims, 11 Drawing Figures

WINGED REENTRANT ELECTROMAGNETIC COMBUSTION CHAMBER

BACKGROUND OF THE INVENTION AND PRIOR ART

The present invention pertains generally to the electromagnetic (EM) stimulation of combustion in internal combustion (IC) engines for achieving high efficiency and low emissions through the rapid combustion of very lean air-fuel mixtures. In particular, the improvement pertains to modifying the geometry of the combustion chamber principally by adding dielectric filled extensions ("wings") to the periphery of a standard piston engine combustion chamber for the purposes of lowering and controlling the EM operating frequency, as well as to improve the coupling, and the containment and stability of the EM energy with piston motion near engine top-dead-center, TDC. These improvements are achieved by exciting specific modes developed herein, preferably at UHF frequencies, and which use both the main combustion chamber and wings to achieve their desirable result.

The present approach to improve engine efficiency and lower emissions (necessary to meet emisson standards) is the computer controlled/catalytic converter water-cooled gasoline engine, and the diesel engine. The former is very expensive, complex and fuel inefficient, and the latter is very expensive, complex, heavy and has serious emission problems (soot and NOx). Variations of these two engine types, such as stratified charge and fast lean burn engines, are improved systems but still have the shortcomings of requiring high swirl to operate (which reduces efficiency through increased heat transference and air-pumping losses), computer controlled three-way catalytic converter operation, and conventional cooling systems. Most notable of these are the Honda CVCC engine, the May Fireball, and the Nissan Naps-Z engine. There is a great need for an engine that is highly fuel efficient, inexpensive, simple and clean.

An alternative approach to improving the IC engine is to design the engine to operate an extremely lean mixture (beyond that considered feasable or practical today), and to increase its flame speed, so that it can meet emission standards, and achieve high efficiency, through the combustion process itself. There is much prior art on improving ignition of very lean mixtures, with almost all of it pertaining to effecting air-flow characteristics and improving the ignition sparks.

This invention pertains mainly to electromagnetic means for improving combustion, and particularly for stimulating the burn so that the lean limit of flammability is extended and the flame speed is increased. It relates to U.S. Pat. Nos. 3,934,566 and 4,138,980, which disclose systems for improving combustion through EM stimulation, and to U.S. Pat. No. 4,297,983, which discloses a modification of the piston face used for exciting a microwave mode designated as the "spherical re-entrant".

However, the thrust of the present invention is to extend the periphery of the combustion chamber, to substantially lower and control the EM resonant frequency, and to excite principally EM modes which have zero, versus maximum, electric field in the center of the chamber. These modes allow the extended chamber resonance to be even more stable with piston motion, especially for ceramic coated combustion chambers.

OBJECTS OF THE INVENTION

It is the principal object of this invention to add dielectric filled metallic extensions (wings) to the periphery of the combustion chamber of an IC engine, for the purpose of substantially reducing the engine cylinder EM resonant frequency, so that low-cost, high power, easily controllable, low voltage DC (12–24 volt) powered solid state UHF and microwave devices can be used to electromagnetically excite the combustion chamber and stimulate the flame. In conjunction with this improvement, it is a further object of the invention to provide a combustion chamber and microwave coupling means and microwave mode such that high currents exist at the wing tips (with a current loop exciter preferably located there) and low currents exist at the piston-cylinder interface, eliminating the need for chokes. It is another objective of this invention to excite EM modes in conjunction with special shaping of the piston (and cylinder head) and placement of special heat-barrier ceramic dielectric coatings on the piston and cylinder head interior surfaces, such that when viewed as an overall resonant chamber, one achieves good frequency stability (minimum frequency shift) with piston motion about TDC.

It is a further object of this invention to use the control features provided by the low frequency solid state (or triode) devices to modulate the EM power, when it is coupled to the flame-plasma loaded combustion chamber, so as to minimize production of spatially fixed continuous ionization discharges, so that EM energy is effectively coupled to the propagating flame front (for the premixed, homogeneous charge engine).

Further objects include use of this improved EM combustion chamber in conjunction with an ultra-lean mixture combustion IC engine, preferably operating as a minimally cooled or adiabatic engine, and using dual plasma ignition for further reduction in burn time. Other features and advantages will be pointed out hereinafter, and will become apparent from the following discussion including a Summary of the Invention and Description of Particular Preferred Embodiments of the invention when read in conjunction with the accompanying drawings.

SUMMARY OF THE INVENTION

This invention comprises an internal combustion engine, either carburetted, intake manifold fuel injected, or Direct Injection (DI) (as in a diesel engine), operating preferably under very lean air-fuel mixture conditions with minimal cooling, and using electrical (spark) or other high energy means for ignition (preferably dual plasma ignition), and electromagnetic (EM) energy for combustion stimulation purposes, such EM energy maintained in a novel combustion chamber in which dielectric filled metalic wings are placed at the periphery of the combustion chamber.

The combustion chamber features piston-cylinder head and wing design to give low EM frequency operation (preferably UHF) powered by preferably solid-state EM generating devices which can be controlled and modulated for optimizing coupling of the EM energy to the flame plasma. Preferably, EM modes with high currents at the center of the combustion chamber and low currents, moderate to high electric fields at the piston cylinder gaps, are used. With such modes, ceramic coatings (piston and cylinder head) are more easily incorporated since the frequency shift with piston position about TDC with such coatings can be compensated by the natural frequency shift of the high current mode (to give minimal frequency shift with piston motion).

In the DI engine case, preferably one central fuel injector is used, which sprays fuel in two radially outwards 180 degree apart spray patterns generally toward two spark plug ignition sources placed similarly 180 degrees apart and about one-third of the way between the center of the piston and its edge. The microwave coupling loop is preferably placed at the edge of the wing (a high current point) along the line joining the two spark plugs. Preferably, a ceramic piece is placed on the piston cap, which with the ceramic filled wing and possibly ceramic cylinder head coating, reduce the heat transfered to the environment.

In the homogeneous charge (gasoline) engine, the above is a preferred embodiment, excepting that no central fuel injector is used. The central region can be used for increasing the size of the valves or introducing an ignition source or microwave coupler.

In the normal operation, a preferably very lean air-fuel mixture is ignited near TDC by two radially disposed spark plugs. Immediately the microwave power is energized at a modulation frequency of say 10 KHz and say 50% duty cycle (50 microseconds on, 50 microseconds off) for an engine crankshaft angular duration of say between 18 degrees and 36 degrees, by means of a coupling loop contained in the wing edge and oriented to excite the magnetic field component (giving radially inwards currents with preferably maximum value at the center of the chamber).

At each ignition site, initial flames develop. For high EM currents at the center (and high electric field near the wall), the outer regions of each flame kernel will move towards higher and higher electric field and be stimulated and speeded up. The electric field magnitude will be near the value needed to form plasma discharges at the flame front of a moderately lean flame. The inner portions will be moving towards each other and thus thermally reinforce each other and receive less of the EM energy (electric field low near center). Minimum NOx will form because of the lean mixture (low flame temperature) and minimum HC because of the excess oxygen condition of lean mixtures, reinforced in this case by electromagnetic stimulation of the hydrocarbon oxidation process, and by the warmer surfaces brought about by the preferably minimal cooling of the engine and low heat conduction and heat capacity of the ceramic liners, and electromagnetic (skin) heating of the surfaces (skin effect). Low currents will exist at the piston-cylinder junction so no EM effect will be caused by motion of the piston.

Therefore, through the controlled EM stimulation of the very lean mixture combustion contained in an extended metallic combustion chamber lined preferably with heat insulating ceramic coatings, there is provided a substantially improved IC engine system capable of operating on an extremely lean mixture giving very high efficiency and low emissions without catalytic converters and ancillary equipment.

BRIEF DESCRIPTION OF THE DRAWINGS

The nature and objects of the invention are illustrated and described in reference to the following drawings, which also illustrate the preferred embodiments of the invention:

FIG. 1 depicts, in cross section, a preferred embodiment of the invention in terms of the wing structure, EM loop coupler, dual ignition, chamber shape, and ceramic coatings. The figure is a cross-sectional side view of the top end of a single cylinder engine depicting the cylinder head, piston and cylinder, and including both preferred operational features of the engine such as the dual igniters (spark plugs), the wing structure, the microwave loop coupler, and ceramic coated special piston shape, and standard operational features such as the rocker arm, push rod, valve spring, etc., and a central access port for a fuel injector or other device such as microwave (EM) coupler or igniter. The ceramic filler and coatings serve both EM purposes (as dielectric layers) and heat barrier purposes i.e. the engine is operated adiabatically or minimally cooled, providing minimum heat transference between the working fluid (air-fuel mixture) and the outside environment.

In FIG. 3a, the wing is incorporated vertically up into the cylinder head periphery and uses a vertical EM coupler. In FIG. 3b the wing is incorporated vertically down into the top part of the cylinder and uses a horizontal coupler.

DESCRIPTION OF PREFERRED EMBODIMENTS

Figure 1:
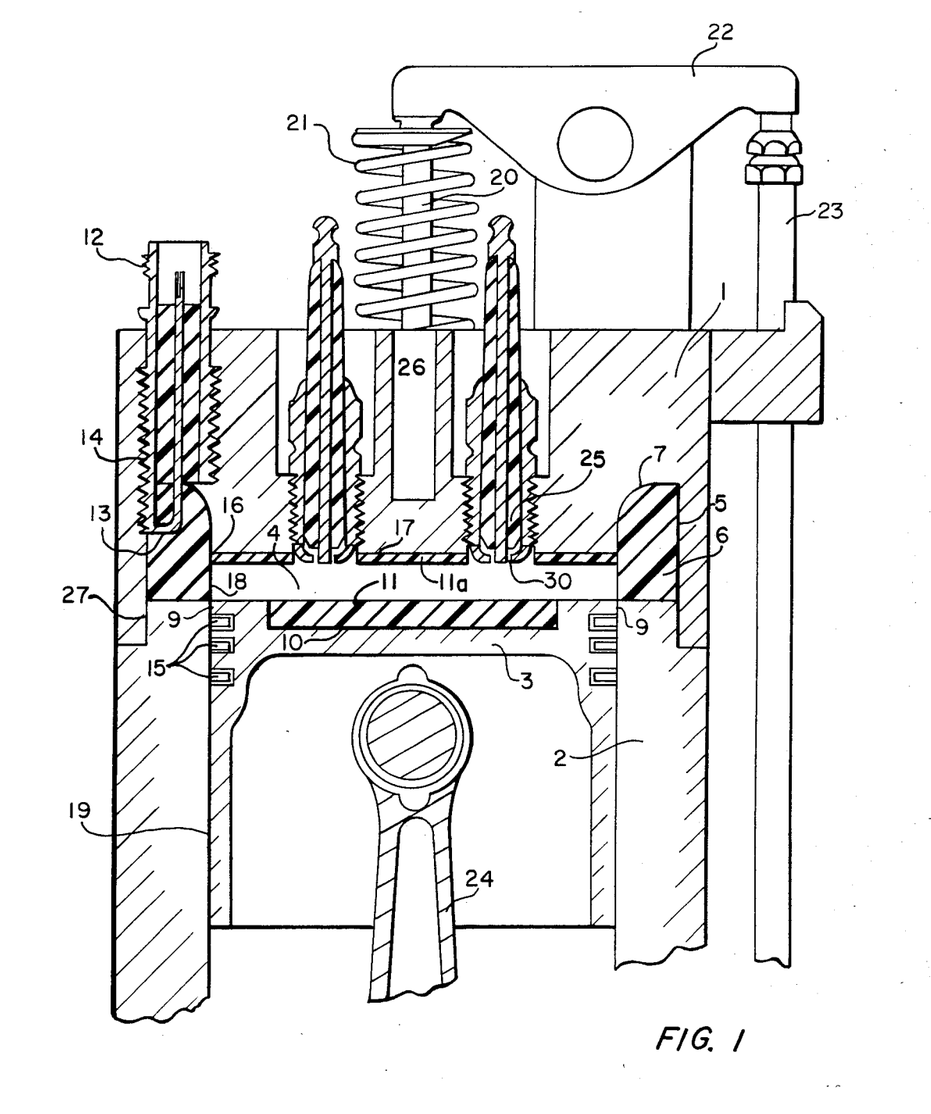

FIG. 1 depicts an approximately to scale preferred embodiment of the "Winged Reentrant" engine invention, as it shall be referred to henceforth, characterized by combustion chamber 4 with extension wings 5 containing dielectric material 6 of relative dielectric constant $\epsilon_r$. Shown in the figure is the cylinder head 1 with a ceramic coating 11a in contact with the combustion chamber 4; the top half of the cylinder 2; the piston 3, with the preferred top face composed of an indented structure 10 containing a ceramic insert 11 with a preferably flat top for improved structural characteristics. Shown also is the electromagnetic (EM) coupler 14 with standard connecting means 12 (female N-type shown here) for accepting EM energy and transmitting it into the combustion chamber 4 by means of the loop 13 located at the extreme edge 7 of the wing 5. This region 7 is one of high EM current and associated magnetic field H, so that coupler 14 (loop 13) can couple (excite) EM energy through magnetic induction for transmission into the winged chamber 4/5, as is well known by those versed in the art of EM coupling.

Other standard engine components are also shown, piston rings 15, piston skirt 19, valve stem 20, valve spring 21, rocker arm 22, pushrod 23, connecting rod 24.

This figure also depicts the (preferred) combustion chamber design developed on the basis of the the WMR110 EM mode, which is one of the four lowest EM modes to be defined and designated with reference to FIGS. 4a, 4b, 4c and 4d. As with the other three modes to be defined, EM current begins to flow from edge 7 downwards along the inner metallic surfaces defining the combustion chamber/wing extension 4/5. The EM currents flow within a thickness of a few skin depths, a well known quantity to EM engineers, equal to about 0.001" (one mil). More specifically, the current reaches the junction 16 and moves along the metallic surface 17, up and around the other side of the wing 5, down and across the piston-cylinder gap 9 and along piston metallic surface 10, across the other gap 9 and returns to the coupler to form a complete circuit.

Associated with the EM current flow described above are regions of charge bunching with associated high electric fields maintained between the piston and cylinder surfaces 10 and 17 respectively. It is these fields that produce the EM stimulation of the combustion (as has been described well in the prior art). The manner in which the currents flow and the charges are set up are governed by the Maxwell equations for dielectric media, solved with boundary conditions. In this case the dimensions, geometry, and material properties enclosed in winged chamber 4/5 (defined by the metallic surfaces that bound 4 and 5), are the governing material properties and boundary conditions of the problem. The problems of establishing resonant frequency of the EM mode or field structure which can be maintained in 4/5, and the manner in which it shifts with piston position around top dead center (TDC), were recently solved by Ward and are described below with reference to FIGS. 4a, 4b, 4c and 4d.

Another feature of the invention when used specifically with the WMR110 mode is the use of two plasma (spark plug) igniters 25 disposed about one half of the way between the chamber 4c enter and the chamber edge 18, and along a line preferably through the center which also inersects the coupler 14, as is shown. In this configuration, central region 26 can be used for fuel injection means (FIG. 5) as in a direct injection engine. The features of this engine (both carburetted and direct injection) as electromagnetic stimulated very lean burn systems will be more readily understood with reference to the other figures and the technical information presented in conjunction with them.

Figure 2:
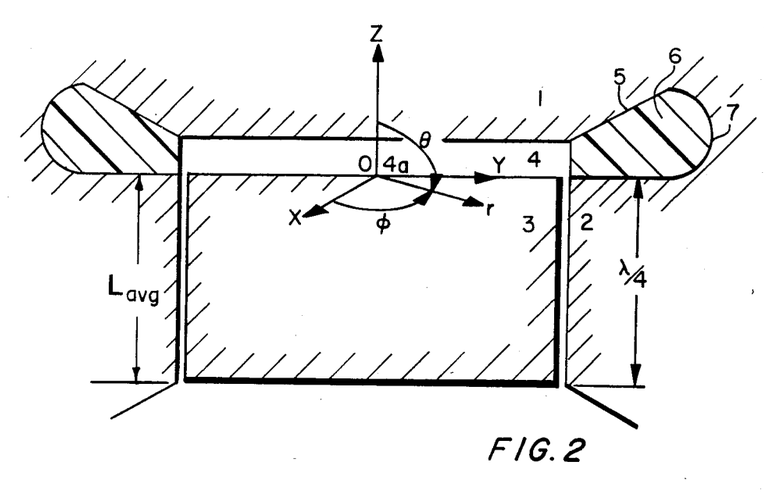
FIGS. 2 and 2a are a generic form of the wing structure incorporated in a generic piston IC engine, showing the relation of the wing to the other parts (and includes a coordinate system).

FIG. 2 depicts the generic form of the "winged" structured combustion chamber, showing generic cylinder head 1, cylinder 2, piston 3, combustion chamber 4, and ceramic 6 filled wing 5. Note that because the annular slot extensions to 4 look both like "wings" and like the reentrant type of cavity (defined by the cylinder head, "wing" and piston), we have called the electromagnetic chamber 4/5 so defined as the "Winged Reentrant Chamber" When used in this context, it is understood as an electromagnetic chamber (cavity), in which high currents exist at the extremes of the wings 7 (surfaces free of gaps) and in which current/charge and magnetic/electric field distributions exist within the volume. Also superimposed is a cylindrical coordinate system for defining quantities and to present the technical features of the invention.

This figure also depicts the piston skirt length Lavg as one quarter wavelength long ("avg" meaning average as it may be cutout), allowing the piston to naturally behave as an EM choke to prevent current leakage into the crankcase. This is made possible by the chamber 4/5 frequency lowering effect permitting operation at say 915 MHz (915 million Hertz), the lowest microwave frequency allocated for industrial use, giving a quarter wavelength of about three inches (the typical automotive IC engine skirt length).

Figure 3A:
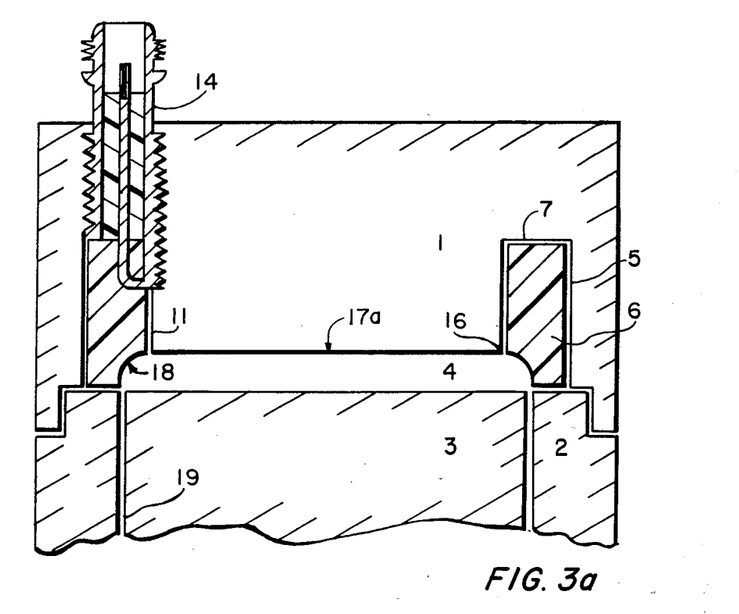
FIGS. 3a and 3b depict two different ways of incorporating the wing in the engine.
Figure 3B:
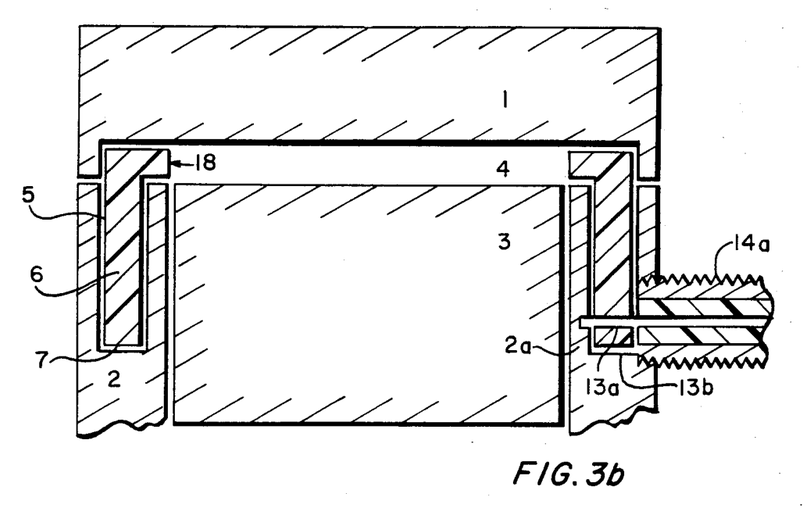

With reference to FIGS. 2, 3a and 3b, it is evident that the wing can be oriented in any convenient way (sideways, upwards, downwards, etc). Furthermore, since the extensions or "wings" are dielectric filled (preferably ceramic filled), they do not effect the engine displacement or compression ratio (CR), but do effect the electromagnetic (microwave or UHF) dimensions, making them substantially electrically larger by both the actual volume effect and the dielectric insulator filler effect 6.

Figure 2A:
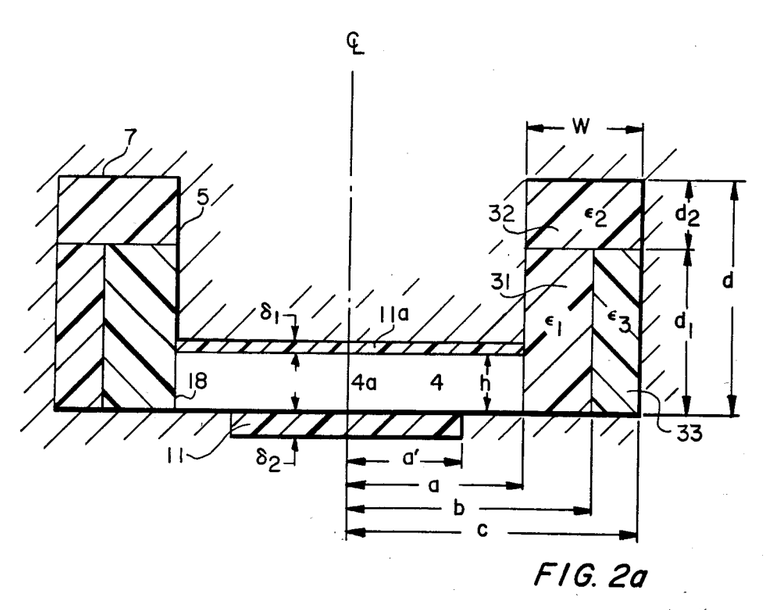

FIG. 2a depicts a preferred positioning of the wing 5 with respect to 4, and is also used to define the key parameters of the design. As stated above the main feature of the wing 5 is that it increases the electrical (EM) dimension of the combustion chamber without changing the combustion chamber size. To first order it increases the electrical radial dimension from:

$$2a \text{ to } 2a+(2d)*\epsilon_r^{\frac{1}{2}}.$$

To the simplest approximation it therefore lowers the resonant frequency of the chamber from: f to $f*(2a/(2a+(2d)*\epsilon_r^{\frac{1}{2}}))$.

Also shown in FIG. 2a are various ways of incorporating more than one dielectric filler, i.e., two parallel layers 31, 33, in combination with the series layer 32. For the two parallel layer case where the wings are in the axial z direction as depicted here, the two layers can be replaced by a single layer defined as $\epsilon$ eff. according to:

$$\epsilon \text{ eff.} = (\ln c/a)/[(1/\epsilon_1)*\ln b/a + (1/\epsilon_2)* \ln c/b]$$

since the section containing the materials can be viewed as a section of transmission line with the layers 31 and 32 representing two series capacitances. The parameters a, b, c, $\epsilon_1$, $\epsilon_2$ are defined in FIG. 2a. "ln" is the natural logarithm.

Below are listed the key parameters which characterize the winged combustion chamber:
  2a—piston diameter
  h—piston to cylinder head height at TDC
  d—wing (combustion chamber extension) length
  w—wing width (c-a)
  $\epsilon_i$—relative dielectric constant of wing ceramic filler
  $\delta_1$—thickness of piston ceramic coating
  $\delta_2$—thickness of cylinder head ceramic coating Note that $\epsilon_i$ represents the relative dielectric constant of the ith layer of a wing dielectric filler 6. If only one material exists, we designate it as $\epsilon_r$.

With reference to FIGS. 2, 2a, we can now enumerate the advantages which the Winged Reentrant structure, when used in conjunction with other features disclosed herein, provide for EM stimulated combustion in the IC engine. The design:

1. Will allow for frequency flexibility, and in particular, allow operation at the lowest possible electromagnetic frequency. This is advantageous since low frequency (UHF) EM sources:
   (a) Are more easily controlled (diode-type and solid state);
   (b) Are lower cost;
   (c) Provide more power/dollar and greater efficiency;
   (d) In the form of solid-state, can operate directly off a car battery (low DC operation: 12 to 32 volts DC);
   (e) In the form of low frequency solid state, they would be powered and controlled by circuits built by quasi-standard circuit board techniques.

2. Will allow utilization of the piston as a choke by matching the wavelength and piston dimensions, as is indicated in FIG. 2 where the piston is shown to be a quarter wavelength long.

3. Will place the region of high electrical current on surfaces that are totally closed (free of voids, gaps, cracks), and will force regions of moderate and high charge at the gap regions i.e. the piston-cylinder gap 9, cylinder head-cylinder joint 27.

4. Will provide sufficient control to give good frequency stability near TDC (with respect to piston motion).

5. Will allow for simple, low cost EM coupling means.

6. Will allow for ceramics to be used in the design for reduced heat transfer.

7. Will permit the EM power to be modulated, so as to prevent the formation of spatially fixed EM plasma discharges, and allow most of the energy to be coupled to the flame front, which will be a propagating front in the carburetted engine case.

FIGS. 3a and 3b depict two preferred orientations of the wings with respect to the combustion chamber 4, characterized by minimizing the side cross-sectional dimensions of the engine and reducing heat transfer at perimeter 18 of combustion chamber 4. In FIG. 3a, the wing 5 is inserted in the cylinder head 1, providing the advantages of easy access for the EM coupler 14 and of providing one continuous surface all the way to the center of the cylinder head surface 17a. Furthermore, the ceramic filled wing 5 may protrude into the combustion chamber as is depicted (vertical line joining 16 and 7 is inside of the piston 3 and cylinder 2 intersection or skirt 19). This may improve frequency stability or reduce the cylinder head 1 dimensions.

In FIG. 3b, the wing 5 is inserted in the cylinder 2 itself, providing the advantage of a potentially larger wing 5 and reduced heat transfer because of the sandwiched ceramic 6 in the cylinder wall 2. In this case a side coupler 14a can be used, and a loop 13b is formed by grounding the center conductor 13a against the inner region 2a of the cylinder 2.

FIGS. 4a, 4b, 4c, and 4d are different combustion chamber shapes suitable for each maintaining one or more of the four EM modes to be disclosed. The four modes fall into two classes depending on whether the electric field (or charge) is maximum at the centers 4a, or whether the magnetic field (or current) is maximum. The maximum electric field cases are designated as "Electric Reentrant", "Winged" being understood, and use the symbol WER to indicate them. The maximum magnetic field cases are designated as the "Magnetic Reentrant" and use the symbol WMR to indicate them.

Figure 4A:
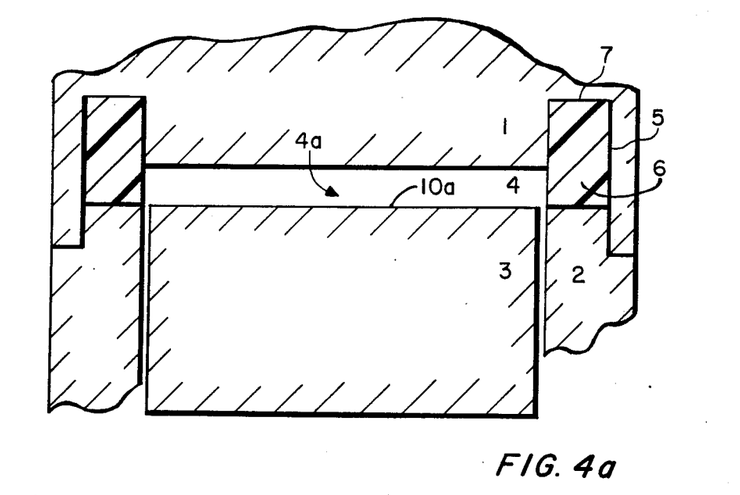
FIGS. 4a, 4b, 4c, and 4d depict the central portions of combustion chamber designs suitable for maintaining the lowest order EM wing reentrant modes, the electric reentrant (FIGS. 4a and 4b), and the magnetic reentrant (FIGS. 4c and 4d).
Figure 4B:
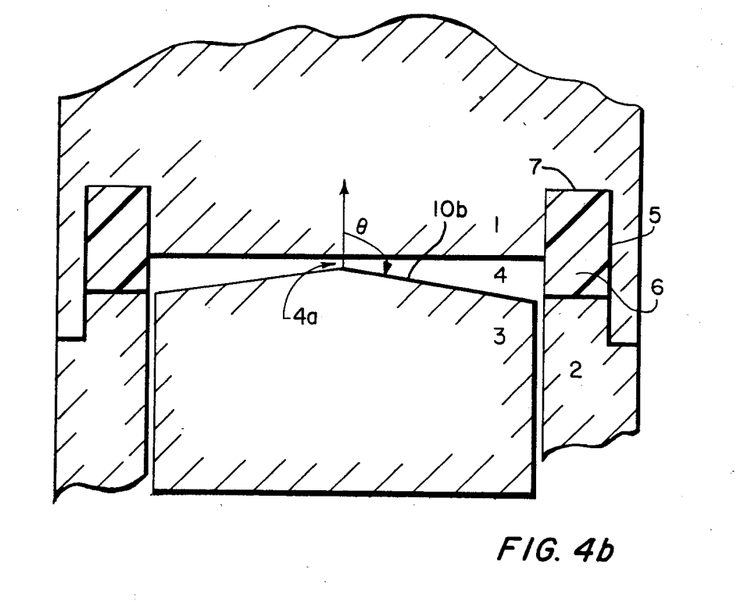

Of the four modes to be disclosed, two are of the WER type and are similar to each other and designated as WER010(flat) and WER010(cone). "Flat" and "cone" indicate the shape of the piston faces 10a, 10b (FIGS. 4a and 4b respectively). The WER010 (flat) corresponds to the cylindrical TM010 mode for r<a, which has been disclosed in U.S. Pat. No. 4,138,980 and is well known by those versed in microwave cavity resonators. The WER010(cone) corresponds to the conical "spherical re-entrant" mode for r<a, disclosed in U.S. Pat. No. 4,297,983. The other new, more important modes, designated as WMR010 and WMR110 are developed herein.

The three numerals after each symbol represent respectively the number of quarter wavelengths (or half if quarter is not permissible) in the angular $\phi$, the radial r, and the axial z directions. "Zero" clearly indicates no variation in that direction, so that the WER010 mode has no variation in the angular $\phi$ and axial z directions (is independent of those directions).

What is necessary is to be able to specify the EM field components making up each mode within the entire EM chamber 4/5, and to solve for the equation which specifies the resonant frequency f (in terms of the chamber dimensions and dielectric property of the fillers).

Within the combustion chamber (r<a), the EM components for three of the four modes are given below in a tabular format:

| WER010 (flat) | WER010 (cone) | WMR010 |
|---|---|---|
| $Ez = A\ Jo(kr)$ | $Ez = A^*\cos(kr)/kr$ | $Ez = A^*\sin(kr)/kr$ |
| $H_\phi = A^*(1/i\zeta_0)^*J1(kr)$ | $H_\phi = A^*(1/i\zeta_0)^*\sin(kr)/kr$ | $H_\phi = A^*(-1/i\zeta_0)^*\cos(kr)/kr$ |

Note that since the cone angle $\theta$ (FIG. 4b) is near 90 degrees, we have replaced $E_\theta$ by Ez, the axial electric field, and sin $\theta$ by 1 for the WER010(cone) mode given above, so no $\theta$ dependence appears. The mode behaviours along the wing length are the same, and are governed by the transmission line mode equations given hereafter:

$Er = B \sin (k1z) + C \cos (k1z)$ $H\phi = (1/i\xi_0)^* \epsilon_r^{\frac{1}{2}*}[B \cos (k1z) - C \sin (k1z)]$ where:
Er is the radial electric field component,
Jo, J1 are the zero and first order Bessel functions,
$k = 2\pi f/C$ is the wave propagation constant, where f is the operating frequency and C is the speed of light,
$k1 = k^*\epsilon_r^{\frac{1}{2}}$
$i = \sqrt{-1}$
$\xi_0$ = the free-space impedance constant, equal to 120 ohms.

It has been assumed here that since w<<a, the "r" dependence of the coefficients B and C can be ignored, and replaced by a mean value within "w".

These equations were solved using the boundary conditions defined by FIG. 2a assuming only one dielectric filler 6 in the wing 5, and the absence of coatings on 11, 11a on the cylinder head and piston face. The solution is similar for all three cases and differs only by the rightmost term. It is therefore written as:

$$\tan(k\epsilon_r^{\frac{1}{2}}d) = \epsilon_r^{\frac{1}{2}} * (h/w) * [1/(1-w/2a)] * R$$

where:
  $R = J_0(ka)/J_1(ka)$ ... for the WER010 (flat piston) mode,
  $R = \cot(ka)$ ... for the WER010 (cone piston) mode,
  $R = -\tan(ka)$ ... for the WMR010 mode.

In order to evaluate the the resonant frequency f $[f=(kC)/2\pi]$ for a particular mode, one specifies the various parameters and solves the above equation.

The WER modes provide the lowest possible frequency as their principal main advantage, but suffer from the main disadvantage of poor frequency stability with piston motion about TDC (for the present Wing Reentrant geometry). Since the electric field dominates in the piston area (r<a), the frequency drops as the piston approaches TDC. The effect of compressing the air (increasing its dielectric constant) further lowers the frequency, as does the presence of ceramic layers on the piston and cylinder head surfaces, thus compounding the problem.

The WER modes are most useful where there is minimal chamber change, as in jet engines, burners; or where EM power is coupled for only a few degrees about TDC; or where they are used for EM ignition purposes (where the WER010(cone) mode would provide a large electric field at the cone tip 4a (FIG. 4b) as disclosed in U.S. Pat. No. 4,297,983). In addition were one ignition source is preferred, or is more practical (as in the "bowl-in-piston" direct injection engine), the single central electric field peaked nature of the WER modes may be more useful (despite their shortcomings).

Clearly, such devices as a compressible movable plunger can be placed on the piston or cylinder top to compensate for the frequency shift with piston position about TDC, or the EM supply could be tuned to maintain the correct resonant frequency with piston position about TDC (for the frequency sensitive WER modes).

The WMR modes, on the other hand, with appropriate piston shaping and use of ceramic materials, can be made to operate close to the same low frequency as the WER modes, but in their case they can be made to provide perfect frequency stability, since their magnetic field component dominates over the piston region (r<a), increasing frequency with piston motion towards TDC, and thus allowing for cancellation of the air-dielectric and ceramic coating (11, 11a) frequency shift effects.

Unlike the WER modes, they can be made to give exactly zero EM current at the piston-cylinder gap 9 (by making that region the current zero region) thus totally eliminating the need for EM chokes and naturally eliminating EM leakage (these modes are made up of two quarter wavelengths).

Figure 4C:
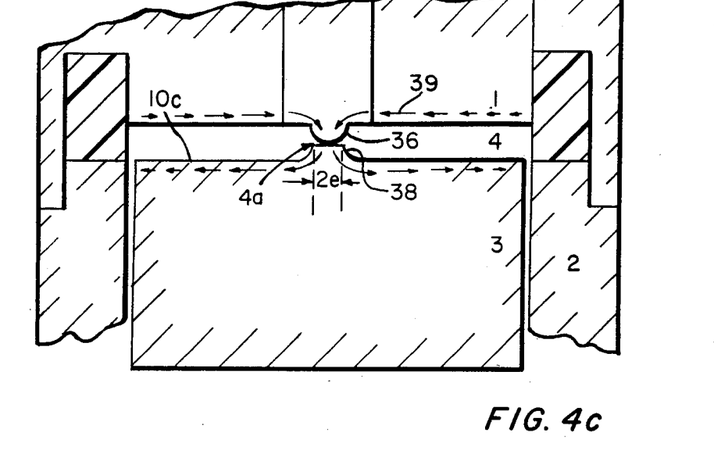
Figure 4D:
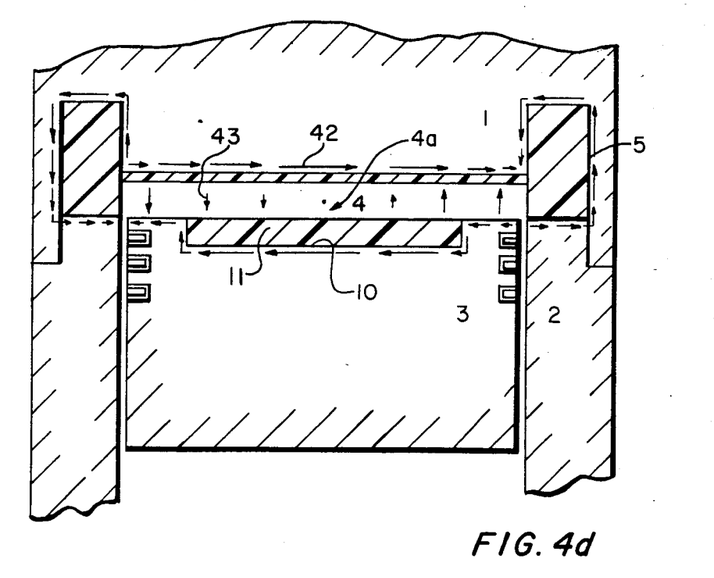

FIG. 4c depicts the ideal chamber for the WMR010 mode and FIG. 4d for the WMR110. Since the WMR010 has symmetric currents 39 with respect to the chamber 4 (the center 4a) and thus must cross over between the cylinder head 1 and piston 3, contacting plunger means 36 must be provided, thus placing a constraint on the usefulness on this mode. On the other hand the WMR110 mode has asymmetric currents 42 (FIGS. 4d and 5a), not requiring a central plunger, which allows solid ceramic disc 11 to be placed on the face of the piston 3. In fact, as will be shown, the WMR110 mode is the ideal candidate for the principal application of this invention, and is particularly suited for the DI engine case where a central access port for the fuel injector 29 (FIGS. 5, 5a) is required.

Returning to the equations which govern the mode frequency, an important simplification was developed by Ward (which is to be published in JMP) for the WMR010 mode (FIG. 4c), which permitted reformating of the equation so that the frequency can be made the subject of the equation (the dependent variable):

$$k = [\pi + (\epsilon_r^{\frac{1}{2}}h'/w - 1) * \sin(k'a) * \cos(k'\epsilon_r^{\frac{1}{2}}d)]/[a + \epsilon_r^{\frac{1}{2}} * d]$$

where:
  $h' = h/(1 - w/2a)$
  $k' =$ first guess for k.

The above equation holds for the very loose condition:

$$|(\epsilon_r^{\frac{1}{2}}h'/w - 1) * \sin(ka) * \cos(k\epsilon HD\ r^{\frac{1}{2}}d)| < \frac{1}{2}$$

This equation has the useful interpretation that the wavenumber k is inversely proportional to the electrical length $(a + \epsilon_r^{\frac{1}{2}} * d)$ corrected by the term $(\epsilon_r^{\frac{1}{2}}*h'/w - 1)$ found in the numerator, which represents the EM discontinuity factor due to the chamber—wing interface 18 (FIG. 1). By choosing $(\epsilon_r^{\frac{1}{2}}*h'/w - 1) = 0$, the discontinuity is eliminated or minimized.

For this mode, another improvement is the elimination of most of the conical shape of the piston face (as in 10b, FIG. 4b) to produce the shape 10c, FIG. 4c. This reduces the frequency according to:

$$(f - f_o)/f_o = -(a/b')*[\ln(a/e) - [(ka)^{2}*A + \sin(2ka)/2ka]]$$

where:
  $A = 1 - (1/6)*(ka)^2 + (2/135)*(ka)^4 - \ldots$
  a = radial distance over which perturbation occurs, taken as the piston radius in this case;
  b' = resonant diameter of completely conical chamber, i.e. $k*b' = \pi$.
  $f_o$ = resonant frequency of unperturbed completely conical chamber;
  f = final, or perturbed resonant frequency;
  2e = width of center protrusion shown in FIG. 4c.

This result is unusual for it corresponds to an EM propagation velocity greater than the speed of light. For a typical 3.5 inch diameter piston, the effect of this perturbation can be incorporated by giving the piston an effective diameter of about 7.4 inches (about twice the size) at an operating EM frequency around 915 MHz.

Additionally, the much more complicated situation of having two colinear dielectrics of relative dielectric constants $\epsilon_1$, $\epsilon_2$, and length d1 and d2 respectively in the wing section (FIG. 2a) was also solved to produce an expression for the frequency which is:

$$k = [\pi + (\epsilon_r^{\frac{1}{2}}h'/w - 1)*A + [\sin(k1d2) - \sin(k2d2)]*B + (1 - h'/w)*C]/[(a + \epsilon_1^{\frac{1}{2}}*d1 + \epsilon_2^{\frac{1}{2}}*d2)]$$

where: $A = \sin(ka)*\cos(k1d1)*\cos(k2d2)$
  $B = \cos(ka + k1d1)$
  $C = \sin(ka)*\sin(k1d1)*\sin(k1d2)$ Finally, the effect of the piston and cylinder head dielectric coatings 11, 11a on the frequency (lowering frequency) is given by the general approximation:

$$(f-f_o)/f_o = -2D * (a^2)*(\epsilon_r-1) * \delta/[\epsilon_r* h * (b^2)]$$

where D is a function of the mode used.

For example, for the WER010(flat) mode:

$$D = [Jo^2(ka) + J1^2(ka)];$$

These expressions define in the entirety the problem and the solution of the WMR010 mode, and contain all the mathematical physics necessary to optimally design the magnetic reentrant chamber. More important, the substantially more complex but ideal WMR110 mode (which does not require a central plunger) can be cast in terms of the WMR010 mode (except for the perturbation equation), and therefore can make use of the considerable simplifying analysis developed by Ward. This is done next.

FIG. 4d depicts the ideal combustion chamber for the WMR110 mode (which is also ideal from our engine perspective). Its corresponding EM current 42 and electric field 43 distributions are shown. Features include a central piston indentation 10 (which lowers the resonant frequency), filled with a ceramic disc 11 which both further lowers the frequency and acts as a heat barrier.

Figure 5:
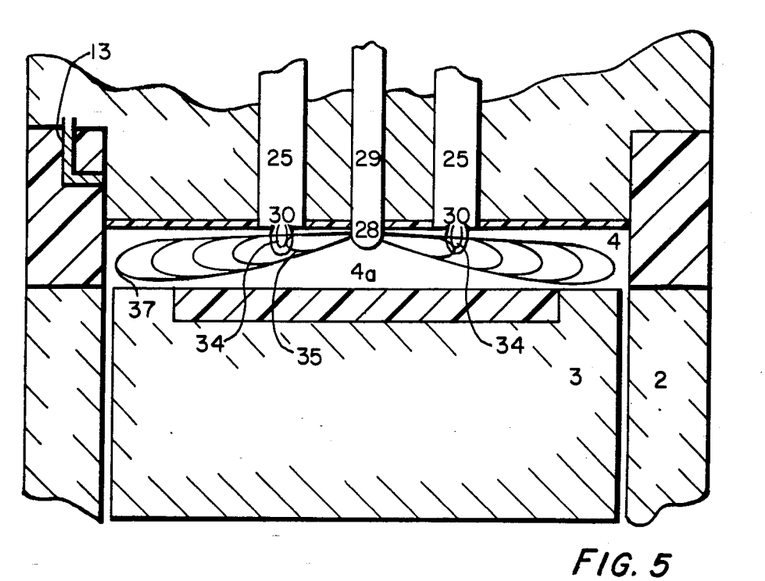
FIG. 5 depicts an engine combustion chamber in which ceramic coatings are placed on most of the surface area exposed to the flame, and a single fuel injector is placed at the middle along with two adjacent ignitors. In this direct injection engine embodiment, the combustion chamber is excited in the preferred WRM110 mode. Several levels of fuel spray are indicated including the minimum and maximum. The minimum spray is designed to reach the two igniters, and the maximum to fall just short of the walls.

As discussed, one can obtain optimal microwave effects in terms of eliminating or minimizing leakage and frequency shift effects with piston motion about TDC by using the WMR110 mode. For ignition near the center 4a, whether by one central or by two ignitors as depicted in FIGS. 1 and 5, one has the additional advantage of a flame moving outwards into regions of increasing electric field, thus minimizing the effect of discharges forming in the flame-plasma tail region (the region which has mostly completed its combustion).

Figure 5A:
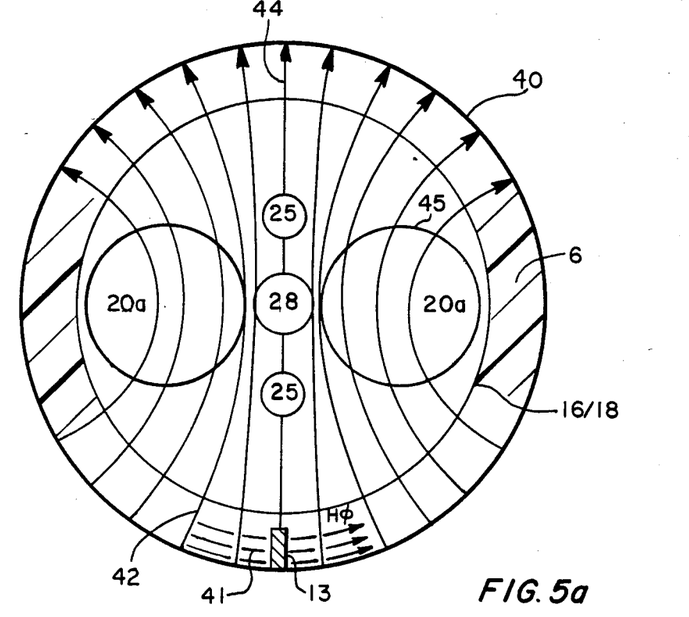
FIG. 5a is a cross-sectional top view of the FIG. 5 embodiment, and indicates the orientation of the EM loop and the EM current distribution.

Another advantage, which is evident in reference to both the equations given below and to FIG. 5a, is the cos ($\phi$) dependence of the dominant fields, which allows us to place the maximum current region ($\phi=0$) in line with the spark plugs 25 (line 44, FIG. 5a), and perpendicular to the line joining the valves 20a (FIG. 5a), minimizing the effect of the valve-cylinder head interfaces 45 (FIG. 5a). Likewise, for the valve orientation relative to the connecting rod 24 (FIG. 1), the thrust faces of the skirt 19 (FIG. 1) are also aligned with the high current line 44 (FIG. 5a), allowing for the cutting out of the piston skirt 19 (FIG. 1) along the non-thrust faces, without significantly effecting the choke action of the piston (shown in FIG. 2).

The field components of this mode for r<a are given by:

$$Ez = A* J1(kr)* \cos(\phi)$$

$$H\phi = A* (-1/(i*\xi_o))* J1'(kr)* \cos(\phi)$$

$$Hr = A* (1/\xi_o kr)* J1(kr)* \sin(\phi)$$

where: J1' is the derivative of J1.

The assumption has been made by Ward, that for the present application, the cos ($\phi$) coefficients (Ez and H$\phi$) dominate, and approximate solutions can be obtained by neglecting the coefficients of the sin ($\phi$) terms (which are linearly independent of the cos ($\phi$) terms. Likewise, the same can be done for the terms along the wing section $0 < z < d$, which have been shown by Ward to be given by:

$$Er = B \sin(k''z) + C \cos(k''z)$$

$$H\phi = (1/i\xi_o)* (k''/k)* [B \cos(k''z) - C \sin(k''z)]$$

where:
$$k'' = k* \epsilon_r''^{\frac{1}{2}} [1 - (4/(k^{2*} (a+c)^{2*}\epsilon_r))]^{\frac{1}{2}}$$
$$k'' = k \sqrt{\epsilon_r''}$$

As before, since w<<a, B and C can be taken as constants. These equations can be solved as before, to give the solution for the frequency as:

$$\tan(k\sqrt{\epsilon_r''}d) = -(\epsilon_r'')^{\frac{1}{2}*} (h'/w)* [J1(ka)/(J1'(ka)]$$

The above equation was simplified by Ward to make k the subject of the equation, by making the approximations:

$$J1(kr) \doteq 0.58 \sin[(\pi/3.83)*kr]$$

$$J1'(kr) \doteq 0.45 \cos[(\pi/3.83)*kr]$$

where $\pi$ and 3.83 (denoted as j) are the zeros respectively of the sin and J1 functions. With this replacement, the result is:

$$k = [\pi + (j/\pi)*\sqrt{\epsilon_r''}*(h'/w) - 1) * \sin(\pi ka/j)* \cos(\sqrt{\epsilon_r''}kd)]/[\pi a/j + \sqrt{\epsilon_r''}d]$$

FIG. 5 (shown approximately to scale) depicts the idealized combustion chamber of FIG. 1 for application to the direct injection engine. Central fuel injector means 29 is introduced into the central region 26 of FIG. 1, and the entire configuration is otherwise similar to that of FIG. 1 excepting for location of the ignitors 25, whose position in this case is determined by the fuel spray 35/37 which leaves tip 28 of the injector 29. Fuel spray 35 represents the minimum radial spray penetration (minimum load) and spray 37 the maximum (maximum load). Cones 34 represent the ignition plasma formed at the ignitor tips (or electrodes) 30. As indicated, the ignitors are located at about a third the radial distance, such that the ignition plasma 34 just intersects the minimum spray pattern 35. Metalic loop 13 is indicated to excite the WMR110 mode with maximum EM current along the line joining the ignitors.

In this application, fuel is sprayed prior to ignition either directly at, or at a small angle from the ignitors 25. The engine is operated preferably at a compression ratio of the same range as the gasoline version of FIG. 1, namely in the range of 9:1 to 12:1. Ignition occurs at the sites 34, and the flame propagates away under conditions of both premixed burning and diffusion controlled burning. The degree of each type is a complex function of timing, spray characteristics, location of ignitors, load, emissions contraints, etc.

The engine of this figure operates with minimum squish. Swirl is also minimized. The superior igniting ability of dual plasma igniters in combination with EM stimulated combustion, allow for sufficiently rapid and controlled combustion, to allow for minimal energy dissipating swirl and squish, reducing heat transference. These concepts are discussed in Ward and Lefevre, U.S. patent application Ser. No. 456,612.

For the cases of FIG. 1 and FIG. 5, typical dimensions for the various ceramic regions are listed below (for the piston diameter range of 3.5" (FIG. 1) to 4.5" (FIG. 5):

$0.3" < w < 0.6"$ $0.2b < a' < 0.5b$ and of-course $a' < a$ $\delta_1 \approx 0.10"$; $\delta_2 \approx 0.25"$ $d < 3"$ $2 < \epsilon_r < 9$ $h \approx w/2$ With these dimensions, one can operate the engine with piston diameter defined by $(3.0" < 2a < 4.5")$ in the WMR010 and WMR110 modes in the frequency range of:

$$300 \text{ MHz} < f < 1{,}500 \text{ MHz}$$

which is a frequency factor of about two to four lower than that obtained without the use of the ceramic filled wing.

In FIG. 5, frequency preferably in the 450 to 915 MHz range is used, and excited in the WMR110 mode. Central fuel injector 29 is used with ignitors 25, so that under moderate load conditions, the major flame propagation is outwards towards higher and higher electric fields, as discussed earlier.

FIG. 5a is a vertical cross-sectional view of the chamber of FIG. 5 (not to scale) excited in the EM WMR110 mode, indicating the lines of EM current 42, and magnetic field $H_\phi(41)$ threading through loop 13. EM exciting loop 13 is shown in line with the ignitors 25, making line 44 the highest electric field and electric current line, which drops off as $\cos \phi$. Line 44 is the $\phi = 0$ line. This loop orientation serves the two purposes of placing maximum electric field at the ignition sites 25, and the high current lines such that they make small angles with the valve—cylinder head junction 45. Near $\phi = 90$ degrees (low current) the lines 42 intersect 45 at right angles (maximum obstruction).

Considering the WMR010 mode (with central plunger required), theory (the equations) predicts that for say a 3.5" bore engine (as shown in FIG. 4c) with a 0.3" piston-to-cylinder head clearance at TDC ($h = 0.3"$) optimum operation at 915 MHz (the industrial allocated frequency) can be achieved by using a wing width $W = 0.6"$, wing length $d = 1.2"$ and filler dielectric constant $\epsilon_r = 5.5$.

For the case of FIG. 5, which shows a 4.5" piston diameter with piston and cylinder head ceramic coatings, the above dimensions will give an operating frequency of about 915 MHz for the WMR110 mode in this case. The lowering frequency effect of the piston indentation, the ceramic coatings, and the larger chamber.

In the typical operation of FIG. 1 or 5, combustible mixture is introduced into the combustion chamber and ignited at the two ignition sites just prior to TDC. EM energy is then conveyed to the combustion chamber during most of combustion via the loop at the wing extreme, to excite the WMR110 mode which is amplitude modulated at say 10 KHz at a 50% duty cycle, giving its maximum electric field near the chamber wall—in the range of 1,000 to 10,000 volts/cm. Q will be in the range of 100 to 500. As the mixture burns, EM energy feeds the flame-front electron plasma stimulating the combustion. Low currents at the piston cylinder-sleeve interface, and proper prior adjustment of the chamber parameters, insures optimal chamber resonant frequency stability and minimal leakage. Ignition sources 25 (especially in the case of FIG. 5) can be (multiple) pulse modulated at the same rate as the EM energy (and preferably mainly out-of-phase) to provide essentially continuous excitation of the mixture and flame by the injection of the ignition plasma and by the EM stimulation.

In this way we have provided through the above described invention, a substantial improvement in the technology of IC engines and other combustion systems, by allowing a very lean mixture to ignite and be burned rapidly and controllably in a combustion environment that produces high efficiency and low exhaust emissions. As used herein "WER010(cone) ignition mode" refers to the ignition process defined above wherein a conical piston face is used, as shown—e.g.—in FIG. 4B, and related discussion above.

Since certain changes may be made in the above apparatus and method without departing from the scope of the invention herein involved, it is intended that all matter contained in the above description, or shown in the accompanying drawings shall be interpreted in an illustrative and not in a limiting sense.

What is claimed is:

1. In a combustion system including at least one combustion chamber with one essentially continuous electrically conducting surface defining at least one major portion of said chamber, means for producing a combustible mixture therein, means for igniting said mixture, means for generating and for conducting to said chamber electromagnetic (EM) energy of frequency f to be resonantly stored in said chamber during combustion of said mixture, the improvement therein comprising a dielectric filled wing electrical volume of annular form placed at a perimeter of said chamber which is sufficient in volume and dielectric properties to lower resonant frequency fo of the chamber excluding the wing by at least one third the value fo, i.e., $f = \frac{2}{3} *$ fo and construction of said volume and means for conducting E energy to provide a maximum of the current produced by conducting EM energy to the chamber in the annular wing and wherein said EM energy conducted during the period of combustion of the mixture is amplitude modulated during said period at a low frequency in the range of 1 KHz to 10 MHz with a duty cycle of a few percent to 100%.

2. The system as defined in claim 1 wherein said chamber is of fixed volume.

3. The system as defined in claim 1 wherein the continuous surface defines a fixed combustion chamber wall, on whose perimeter said wing is connected, and opposite said fixed wall there being movable cyclic compressible means to compress said mixture and to expand to extract work from the combusting mixture.

4. The system as defined in claim 1 wherein said chamber has a cylindrical configuration and wherein said wing forms one continuous electrically conducting surface.

5. The system as defined in claim 4, wherein the perimeter on which said wing is placed, is circular surface defining said cylindrical configuration.

6. The system as defined in claim 5 wherein said continuous electrically conducting surface comprises a cylinder head of internal combustion (IC) engine, and wherein the surface opposite to said cylinder head comprises a movable piston contained in a cylinder sleeve, said piston used to compress said mixture and expand to extract work from combusting mixture.

7. In a combustion system including at least one cylindrical combustion chamber with one essentially continuous electrically conducting surface defining a cylinder head of an internal combustion (IC) engine and wherein surface opposite of said cylinder head comprises a movable piston contained in a cylinder sleeve, means for producing a combustible mixture therein, means for igniting said mixture, means for generating and for conducting to said chamber electromagnetic (EM) energy of frequency f to be resonantly stored in said chamber during combustion of said mixture, the improvement therein comprising circular radially outwards disposed annular wing filled with dielectric material placed at a perimeter of said chamber such that EM energy conducted to said chamber is also conducted and stored in said wing and such that resonant frequency f of said chamber is substantially reduced from the value that would exist without the presence of said wing, and wherein said piston being constructed to compress said mixture and expand to extract work from combusting mixture and wherein said piston has an average length Lavg satifying the relationship:

$$\tfrac{1}{8}\lambda < \text{Lavg} < 3/8\lambda,$$

where $\lambda$ is the free-space wavelength corresponding to f.

8. In a combustion system including at least one cylindrical combustion chamber with one essentially continuous electrically conducting surface defining a cylinder head, and wherein surface opposite of said cylinder head comprises a movable piston contained in a cylinder sleeve, said chamber including a radially outwards disposed circular annular slot or wing forming one continuous electrically conducting surface placed at a perimeter of said chamber and filled with dielectric material and wherein said wing is placed in said cylinder head on a line defined by the piston motion, means for producing a combustible mixture therein, means for igniting said mixture, means for generating and for conducting to said chamber electromagnetic (EM) energy of frequency f to be resonantly stored in said chamber during combustion of said mixture, the improvement wherein the means used to convey said EM energy are a loop disposed at extreme of said wing, said EM coupling loop formed by grounding a center conductor of EM conveying transmission line to an interior surface of said wing, and thus exciting magnetic component of EM energy stored in chamber.

9. The system as defined in claim 8 wherein said wing is placed in said cylinder sleeve, and EM coupling loop is formed by connecting directly a center conductor of coaxial EM transmission line to an inner side wall of the wing interior, with coupler disposed generally perpendicular to said wing (and cylinder sleeve) and near extreme of wing (high currrent region).

10. The system as defined in claim 8 wherein said EM resonant mode used to excite said chamber is the lowest WER mode.

11. The system as defined in claim 10 wherein said piston face has generally upwards pointed central portion defining an EM spark gap with said cylinder head at top dead center (TDC), said gap being part of the WER010(cone) EM mode sustained in the chamber and providing the high voltage needed to cause ignition, and eliminating the need for other independent means of ignition.

12. The system as defined in claim 8 wherein central electrically conducting movable plunger is placed in said cylinder head to make contact with said piston for about 30 degrees either side of TDC and wherein said EM resonant mode maintained in said chamber is the WMR010 mode.

13. The system as defined in claim 12 wherein dielectric coating is placed on part of piston face and cylinder interior surface.

14. In a combustion system including at least one cylindrical combustion chamber with one essentially continuous electrically conducting surface defining a cylinder head, and wherein surface opposite of said cylinder head comprises a movable piston contained in a cylinder sleeve, said chamber including a radially outwards disposed circular annular slot or wing forming one continuous electrically conducting surface placed at a perimeter of said chamber and filled with dielectric material, means for producing a combustible mixture therein, means for igniting said mixture, means for generating and for conducting to said chamber electromagnetic (EM) energy of frequency f to be resonantly stored in said chamber during combustion of said mixture, the improvement wherein the EM resonant mode used to excite said chamber is defined to be the WMR110 mode.

15. The system as defined in claim 14 wherein WMR110 mode is excited in addition to said WER010(cone) ignition mode.

16. The system as defined in claim 14 wherein said EM frequency f, said chamber, and said wing dielectric filler and dimensions are chosen such that maximum EM electric field minimum current are maintained near said chamber perimeter which is also near junction of said cylinder head, cylinder sleeve, and piston.

17. The system as defined in claim 16 wherein frequency shift of EM mode with piston position is minimum about TDC.

18. The system as defined in claim 17 wherein said igniting means comprise two spark/plasma ignitors disposed in said cylinder head about half way distant from the center to said chamber to its perimeter wall.

19. The system as defined in claim 18 wherein a cylindrical dielectric ceramic disc is placed in said piston face and fills a majority thereof.

20. The system as defined in claim 19 wherein dielectric ceramic coating is placed on most of interior of cylinder head.

21. The system as defined in claim 20 wherein said EM WMR110 mode is excited by means of a magnetic loop coupler disposed at the high current end of said dielectric filled wing.

22. The system as defined in claim 21 wherein means for producing said combustible mixture is a fuel spraying device used in combination with air flow to premix air-fuel mixture prior to its combustion.

23. The system as defined in claim 22 wherein said means to premix air-fuel mixture is a carburetor.

24. The system as defined in claim 21 wherein said means for producing said combustible mixture comprises fuel injection means disposed at center of interior of said cylinder head, and injecting fuel under all engine conditions to the sites defined by the ignition plasma of each said ignitor.

25. The system as defined in claim 21 wherein said loop coupler is disposed along a line joining said ignitors such that maximum EM electric field, in the angular cylindrical orientation, lies substantially along said line.

26. The system as defined in claim 24 wherein means for igniting mixture is multiple pulse ignition system operated at a pulse rate equal to the modulation frequency of the EM energy.

27. Method of operating a combustion process comprising igniting a very lean combustible mixture in an enclosed basic volume substantially bounded by electrically conducting surfaces, generating an electromagnetic (EM) energy wave in the combusting mixture by applying external UHF to L-band EM energy thereto, and spreading the wave to establish its resonant wavelength at a dimension greater than the resonant wavelength allowed by the spanning dimensions of the basic volume and, inversely, to lower the resonant frequency of the EM wave by at least one third.

28. Method in accordance with claim 27 wherein EM wave is spread consistent with reducing plasma discharge.

29. Internal combustion engine comprising:
  (a) means defining a basic chamber,
  (b) means defining a member movable cyclically in said chamber to establish a cyclically expanding and compressing space in cooperation with said chamber,
  (c) means for igniting a very lean combustible mixture in said space,
  (d) means for applying EM energy to the ignited mixture, and
  (e) means defining a reentrant in a conducting surface of at least one of the chamber and movable member surface defining said space which is constructed and arranged to admit EM energy to the reentrant from the said space but bar gas flow therefrom such that the reentrant increases the electrical volume of said chamber by at least 50% near top dead center.

30. Engine apparatus in accordance with claim 29 wherein the means (e) comprises a construction of the engine with electrical spanning dimensions exceeding physical spanning dimensions of said space.

31. Engine apparatus in accordance with claim 29 wherein the chamber and movable member are cylindrical and the means (e) comprises a reentrant annular wing in at least one of said chamber and member parts.

32. Engine apparatus in accordance with claim 31 wherein the reentrant is filled with dielectric material.

33. Engine apparatus in accordance with claim 29 wherein the EM energy is applied in the WMR010 mode at resonance.

34. Internal combustion engine comprising:
  (a) means defining a basic chamber,
  (b) means defining a member movable cyclically in said chamber to establish a cyclically expanding and compressing space in cooperation with said chamber,
  (c) means for igniting a very lean combustible mixture in said space,
  (d) means for applying EM energy to the ignited mixture in the WMR 110 mode at resonance, and
  (e) means defining a reentrant in a conducting surface of at least one of the chamber and movable member surface defining said space which is constructed and arranged to admit EM energy to the reentrant from the said space but bar gas flow therefrom.

35. Engine apparatus in accordance with claim 34 wherein WMR110 mode is excited in addition to said WER010(cone) ignition mode.

* * * * *